United States Patent
Roh et al.

(10) Patent No.: US 7,869,434 B2
(45) Date of Patent: Jan. 11, 2011

(54) APPARATUS, METHOD AND SYSTEM FOR ROUTING A BROADCAST DATA FRAME IN A MESH NETWORK WITH MULTIPLE MESH PORTALS

(75) Inventors: Yong-Sung Roh, Icheon-si (KR); Young-Gon Choi, Suwon-si (KR); Jung-Ho Kim, Suwon-si (KR); Jae-Hoon Kim, Seoul (KR); Ji-Hoon Lee, Cheongju-si (KR); Shubhranshu Singh, Yongin-si (KR)

(73) Assignee: Samsung Electronics Co., Ltd. (KR)

( * ) Notice: Subject to any disclaimer, the term of this patent is extended or adjusted under 35 U.S.C. 154(b) by 630 days.

(21) Appl. No.: 11/541,641

(22) Filed: Oct. 3, 2006

(65) Prior Publication Data

US 2007/0081482 A1    Apr. 12, 2007

Related U.S. Application Data

(60) Provisional application No. 60/723,910, filed on Jun. 7, 2006.

(30) Foreign Application Priority Data

Jun. 7, 2006    (KR) ............. 10-2006-0051069

(51) Int. Cl.
    *H04L 12/28*    (2006.01)

(52) U.S. Cl. ............. 370/390; 370/392; 370/401; 370/406

(58) Field of Classification Search ........ 370/390, 370/392, 400, 401, 406
    See application file for complete search history.

(56) References Cited

U.S. PATENT DOCUMENTS

| 6,317,434 | B1* | 11/2001 | Deng ............. 370/432 |
| 7,400,646 | B2* | 7/2008 | Tsuchiya et al. ...... 370/466 |
| 7,502,354 | B1* | 3/2009 | Maufer ............. 370/338 |
| 2002/0137459 | A1* | 9/2002 | Ebata et al. ......... 455/16 |
| 2007/0076730 | A1* | 4/2007 | Rahman et al. ...... 370/406 |

* cited by examiner

*Primary Examiner*—Jayanti K Patel
*Assistant Examiner*—Bo Hui A Zhu
(74) *Attorney, Agent, or Firm*—NSIP Law (57) ABSTRACT

An apparatus, method and system are provided for routing a broadcast data frame in a mesh network with multiple mesh portals. In the mesh network, every mesh point selects and registers its default mesh portal. A mesh portal enters its address in a destination address field of a broadcast data frame received from outside of the mesh network and broadcasts the data frame to inside of the mesh network. The mesh point processes a received broadcast data frame relating to its registered mesh portal, thereby preventing the broadcast data frame from being redundantly transmitted in the mesh network.

23 Claims, 7 Drawing Sheets

(CONVENTIONAL ART)

APPARATUS, METHOD AND SYSTEM FOR ROUTING A BROADCAST DATA FRAME IN A MESH NETWORK WITH MULTIPLE MESH PORTALS

PRIORITY

This application claims the benefit under 35 U.S.C. §119 (e) to a United States patent application filed in the United States Patent and Trademark Office on Oct. 6, 2005 and assigned Ser. No. 60/723,910, and under 35 U.S.C. §119(a) to a Korean Patent Application, filed in the Korean Intellectual Property Office on Jun. 7, 2006 and assigned Ser. No. 2006-51069, the entire disclosure of both of which are hereby incorporated by reference.

BACKGROUND OF THE INVENTION

1. Field of the Invention

The present invention generally relates to a wireless mesh network for use in a Wireless Local Area Network (WLAN). More particularly, the present invention relates to an apparatus, method and system for routing a broadcast data frame that can avoid redundant routing of a broadcast data frame to be transmitted and received in each mesh point within a wireless mesh network with multiple mesh portals.

2. Description of the Related Art

A wireless mesh network provides a new paradigm to wireless network markets in a ubiquitous age. The wireless mesh network is a type of multihop ad-hoc network based on the Institute of Electrical and Electronics Engineers (IEEE) 802.11s standard in which fixed and mobile nodes are connected by radio links such that the high speed Internet can be supported for a specific city or area. The wireless mesh network is a wireless solution very suitable for a wide area such as a university campus where installation of a conventional Wireless Local Area Network (WLAN) is difficult and premises of a stadium, port, airport, park, shopping mall, museum, and center of a city are difficult for the installation of a cable.

The conventional mesh network is provided with multiple mesh points and multiple mesh portals acting as nodes for communicating with an external node such as an external network or bridge. In the following description, the term "node" is the generic term used for every access point forming the mesh network and every access point connected to the mesh network.

Conventionally, only one mesh portal is present in the mesh network. However, IEEE 802.11s currently being standardized supports multiple mesh portals in the mesh network. When receiving a packet, each of the mesh portals determines whether a destination of the received packet is outside or inside the mesh network. If the destination is inside the mesh network, the mesh portal forwards the packet to inside of the mesh network. If the destination is outside the mesh network, the mesh portal forwards the packet to outside of the mesh network. Accordingly, the mesh portals know information about all nodes within the mesh network and can detect a connection of a new node through a registration process for a mesh point that newly joins the mesh network.

When the multiple mesh portals are present in the mesh network, each mesh point transmits a packet only to its default mesh portal in order to limit data frame traffic to be transmitted and received between the mesh points and portals in the form of broadcasting, according to the IEEE 802.11s standard. Every mesh point of the mesh network selects and registers its default mesh portal through a registration process. When a broadcast data frame is transmitted to a network outside the mesh network, it is forwarded only to a registered default mesh portal. Thus, because the mesh portal processes only a unicast data frame specified and received, it only processes the data frame received from the mesh point. When the mesh portal receives a data frame unspecified, the data frame received from the mesh point is discarded.

In this case, a problem exists in that an advantage of the mesh network technology capable of distributing and transmitting traffic cannot be taken, since the default mesh portal is only used even when the multiple mesh portals are present in the network.

On the other hand, when a broadcast data frame is transmitted from outside to inside of the mesh network, redundant routing occurs due to frame broadcasting by the multiple mesh portals and frame broadcasting by the mesh points receiving the frame broadcasting in the prior art. That is, since the broadcast data frame has an "ALL" value in a destination address field for forwarding to all the mesh points, the mesh points perform redundant broadcasting of the same frame broadcast received from one or more mesh portals. Since there is a problem in that network traffic significantly increases while broadcast data frames are looped in the worst case, multiple mesh portals are not allowed in the IEEE 802.11s standard.

Accordingly, there is a need for an improved apparatus, method and system which can prevent redundant routing of a broadcast data frame and also can reduce network traffic by taking an advantage in use of the multiple mesh portals when the multiple mesh portals are present in the wireless mesh network.

SUMMARY OF THE INVENTION

An aspect of exemplary embodiments of the present invention is to address at least the above problems and/or disadvantages and to provide at least the advantages described below. Accordingly, an aspect of exemplary embodiments of the present invention is to provide an apparatus, method and system for routing a broadcast data frame that can prevent redundant routing of the broadcast data frame in a mesh network with multiple mesh portals.

It is another aspect of exemplary embodiments of the present invention to provide an apparatus, method and system for routing a broadcast data frame in a mesh network with multiple mesh portals that can determine whether a destination of the broadcast data frame received by a mesh point is inside or outside the mesh network.

It is another aspect of exemplary embodiments of the present invention to provide an apparatus, method and system for routing a broadcast data frame that can transmit the broadcast data frame using multiple mesh portals in a mesh network.

It is another aspect of exemplary embodiments of the present invention to provide an apparatus, method and system for routing a broadcast data frame that can prevent traffic from being concentrated on a specific mesh portal in a mesh network with multiple mesh portals.

It is another aspect of exemplary embodiments of the present invention to provide an apparatus, method and system for routing a broadcast data frame that can reduce an end-to-end transmission delay by reducing the number of hops required to transmit traffic in a mesh network with multiple mesh portals.

It is another aspect of exemplary embodiments of the present invention to provide an apparatus, method and system for routing a broadcast data frame that can determine whether a reference table is a routing table or a bridge table when establishing a path in a mesh network with multiple mesh portals.

It is yet another aspect of exemplary embodiments of the present invention to provide an apparatus, method and system for routing a broadcast data frame that can determine whether to perform a route discovery procedure or a default bridge procedure when a path is invalid in a mesh network with multiple mesh portals.

In accordance with an aspect of exemplary embodiments of the present invention, an apparatus, method and system are provided for routing a broadcast data frame in a mesh network with multiple mesh portals. In the mesh network, every mesh point selects and registers its default mesh portal. A mesh portal enters its address in a destination address field of a broadcast data frame received from outside of the mesh network and broadcasts the data frame to inside of the mesh network. The mesh point processes a received broadcast data frame relating to its registered mesh portal, thereby preventing the broadcast data frame from being redundantly transmitted in the mesh network.

BRIEF DESCRIPTION OF THE DRAWINGS

The above and other objects, features and advantages of the present invention will be more clearly understood from the following detailed description taken in conjunction with the accompanying drawings, in which.

Throughout the drawings, the same drawing reference numerals will be understood to refer to the same elements, features and structures.

DETAILED DESCRIPTION OF EXEMPLARY EMBODIMENTS

The matters defined in the description such as a detailed construction and elements are provided to assist in a comprehensive understanding of exemplary embodiments of the invention. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

For a better understanding of the present invention, a description of an apparatus and method for routing a broadcast data frame in a mesh network with multiple portals in accordance with the present invention is divided into a case where the broadcast data frame is transmitted from outside to inside of the mesh network and a case where the broadcast data frame is transmitted from inside to outside of the mesh network.

Figure 1:
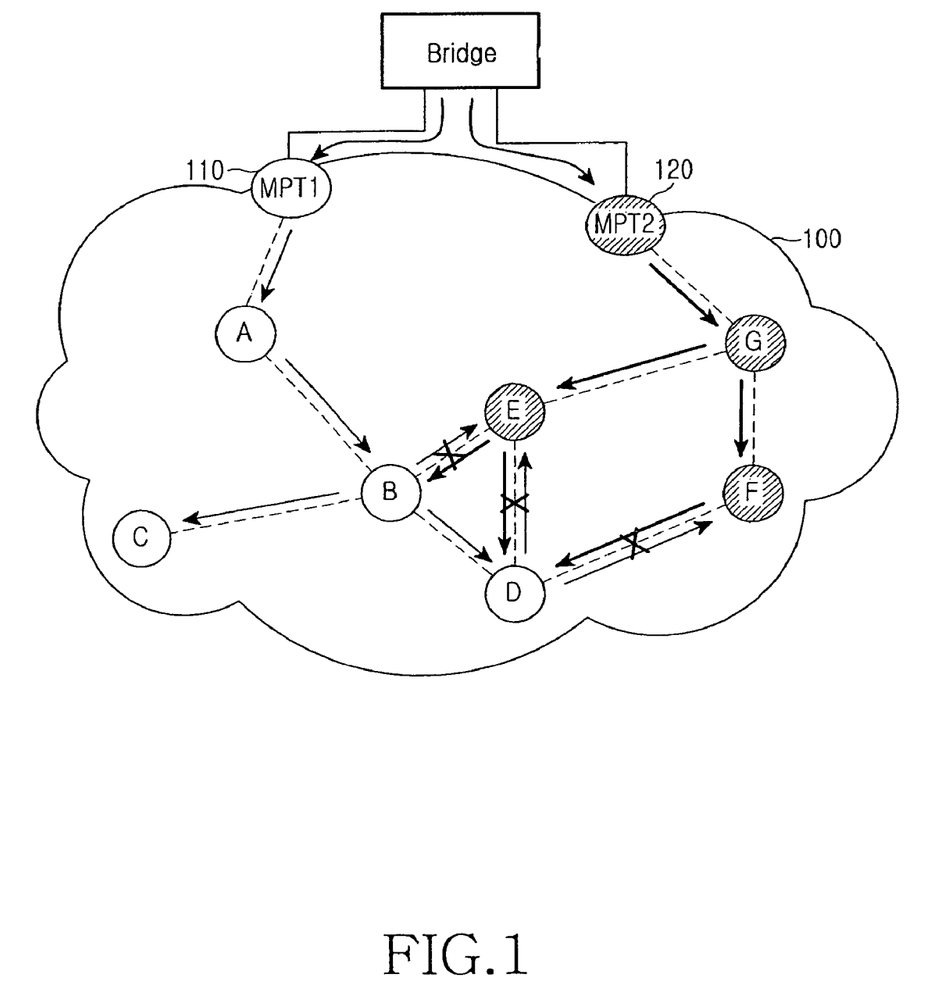
FIG. 1 illustrates a process for routing a broadcast data frame to be transmitted from outside to inside of a mesh network with multiple mesh portals in accordance with an exemplary embodiment of the present invention.
Figure 2:
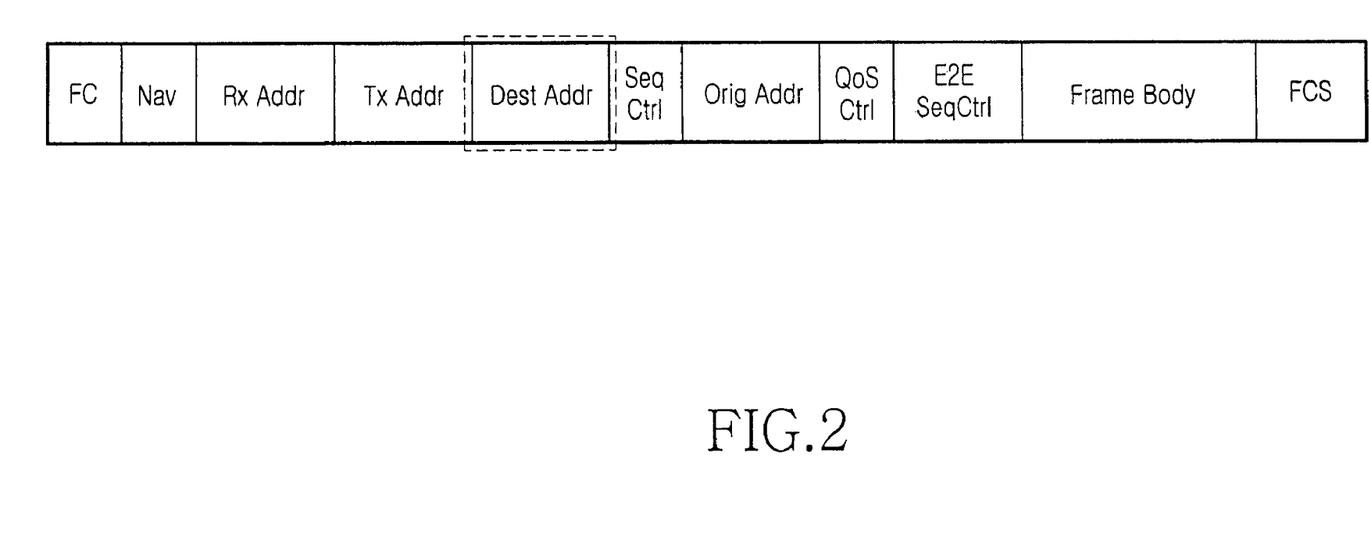
FIG. 2 illustrates a format of a data frame according to the Institute of Electrical and Electronics Engineers (IEEE) 802.11s standard.
Figures 3, 4:
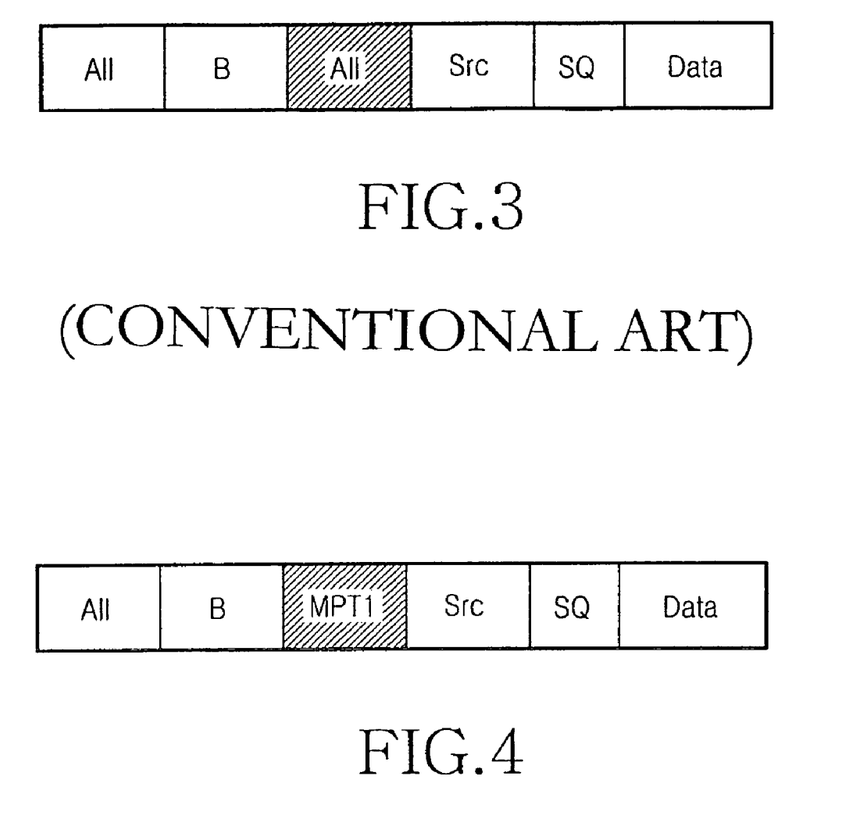
FIG. 3 schematically illustrates main parts of a broadcast data frame used in a conventional routing process.
FIGS. 4 and 5 schematically illustrate main parts of the broadcast data frame used in the routing process of FIG. 1.

FIG. 1 illustrates a process for routing a broadcast data frame to be transmitted from outside to inside of the mesh network with multiple mesh portals in accordance with an exemplary embodiment of the present invention. When the broadcast data frame is transmitted from outside to inside of the mesh network 100 as illustrated in FIG. 1, redundant routing occurs due to frame broadcasting by first and second mesh portals (MPTs) 110 and 120 and frame broadcasting by mesh points (MPs) receiving the frame broadcasting in the prior art. FIG. 2 illustrates a format of a data frame according to the Institute of Electrical and Electronics Engineers (IEEE) 802.11s standard. FIG. 3 schematically illustrates main parts of a broadcast data frame used in a conventional routing process.

As illustrated in FIG. 3, when an "ALL" value is entered in a destination address field such that a broadcast data frame can be forwarded to all mesh points, Mesh Point B broadcasts a frame broadcast received from the second mesh portal 120, and also redundantly broadcasts the same frame received through Mesh Point D. Similarly, Mesh Points E, F, and G perform redundant routing of the same frame. Since a problem exists in that network traffic increases while the broadcast data frame is looped in the worst case, multiple mesh portals are not allowed in the IEEE 802.11s standard.

Figure 5:
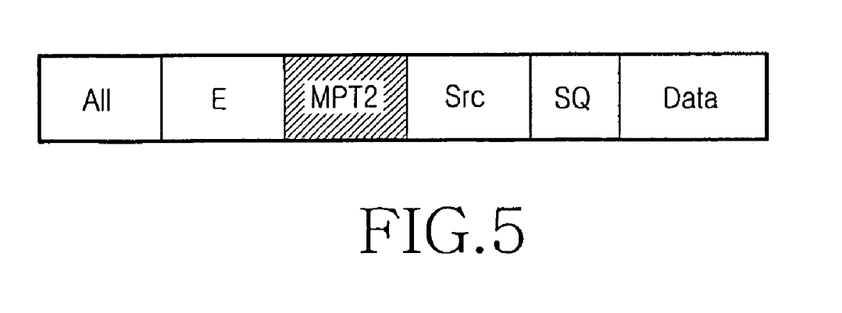
Figure 6:
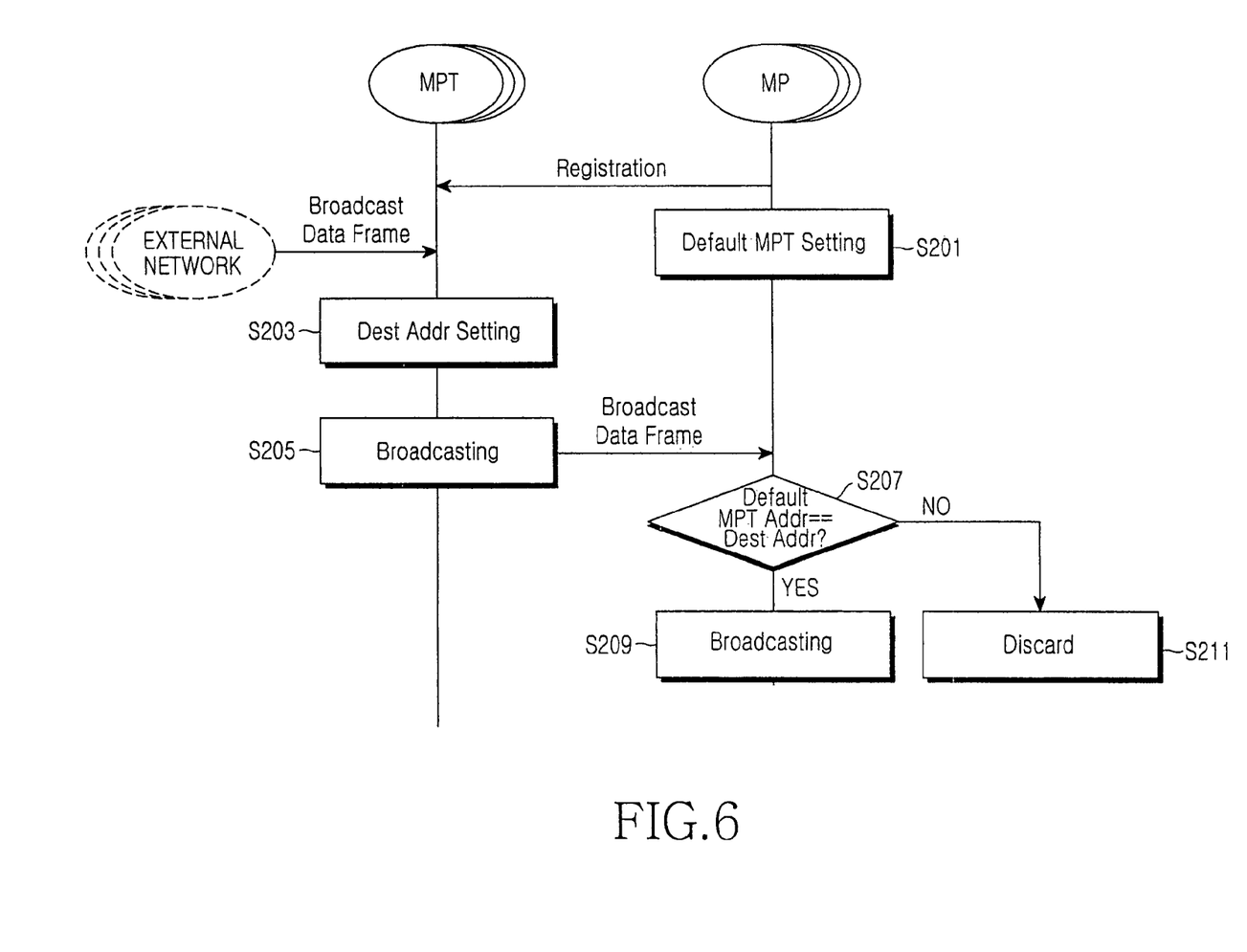
FIG. 6 is a signal processing diagram illustrating a process for routing a broadcast data frame to be transmitted from outside to inside of the mesh network with multiple mesh portals in accordance with an exemplary embodiment of the present invention.

FIGS. 4 and 5 schematically illustrate main parts of the broadcast data frame used in the routing process of FIG. 1. FIGS. 4 and 5 illustrate a four-address frame format as defined in the IEEE 802.11s standard. FIG. 6 is a signal processing diagram illustrating a process for routing a broadcast data frame to be transmitted from outside to inside of the mesh network with multiple mesh portals in accordance with an exemplary embodiment of the present invention.

When a broadcast data frame is received from a network outside the mesh network 100 as illustrated in FIGS. 1 and 6, the first and second mesh portals 110 and 120 enter their address information in a destination address field of the received broadcast data frame (Step S203) and broadcast the broadcast data frame (Step S205), respectively. Every mesh point within the mesh network 100 checks destination address information of the broadcast data frame. The mesh point compares the destination address information with information about its pre-registered default mesh portal from Step S201 (Step S207). If the destination address information is equal to the default mesh portal information, the mesh point broadcasts the data frame (Step S209). However, if the destination address information is different from the default mesh portal information, the mesh point discards the data frame without broadcasting (Step S211).

Referring to FIGS. 4 and 5, the destination address field of a data frame broadcast from the first mesh portal 110 includes an address of the first mesh portal 110 such as "MPT1", and the destination address field of a data frame broadcast from the second mesh portal 120 includes an address of the second mesh portal 120 such as "MPT2". The data frames having different mesh portal addresses in the destination address fields are transmitted to Mesh Points B and E through Mesh Points A and G. The broadcast data frames of FIGS. 4 and 5 are transmitted between Mesh Points B and E. In the routing method of an exemplary embodiment of the present invention, the broadcast data frame of FIG. 5 received by Mesh Point B is discarded without broadcasting. Similarly, the broadcast data frame of FIG. 4 received by Mesh Point E is discarded without broadcasting.

As described above, the method for routing the broadcast data frame in accordance with an exemplary embodiment of the present invention prevents the broadcast data frame from being redundantly processed and reduces a redundant transmission of the broadcast data frame and the number of transmission hops, thereby reducing the overall network traffic and delay. Further, use of the multiple mesh portals is allowed by preventing the broadcast data frame from being redundantly processed. Thus, traffic can be prevented from being concentrated on a specific mesh portal and stability and reliability of the mesh network can be further improved.

In the method for routing a broadcast data frame in accordance with the present invention, address information of a mesh portal can be entered in the destination address field of the broadcast data frame. Alternatively, a data frame can be used in which a field for indicating mesh portal information is added in the form of an option in a state which the basic four-address frame format of the IEEE 802.11s standard is maintained.

Figure 7:
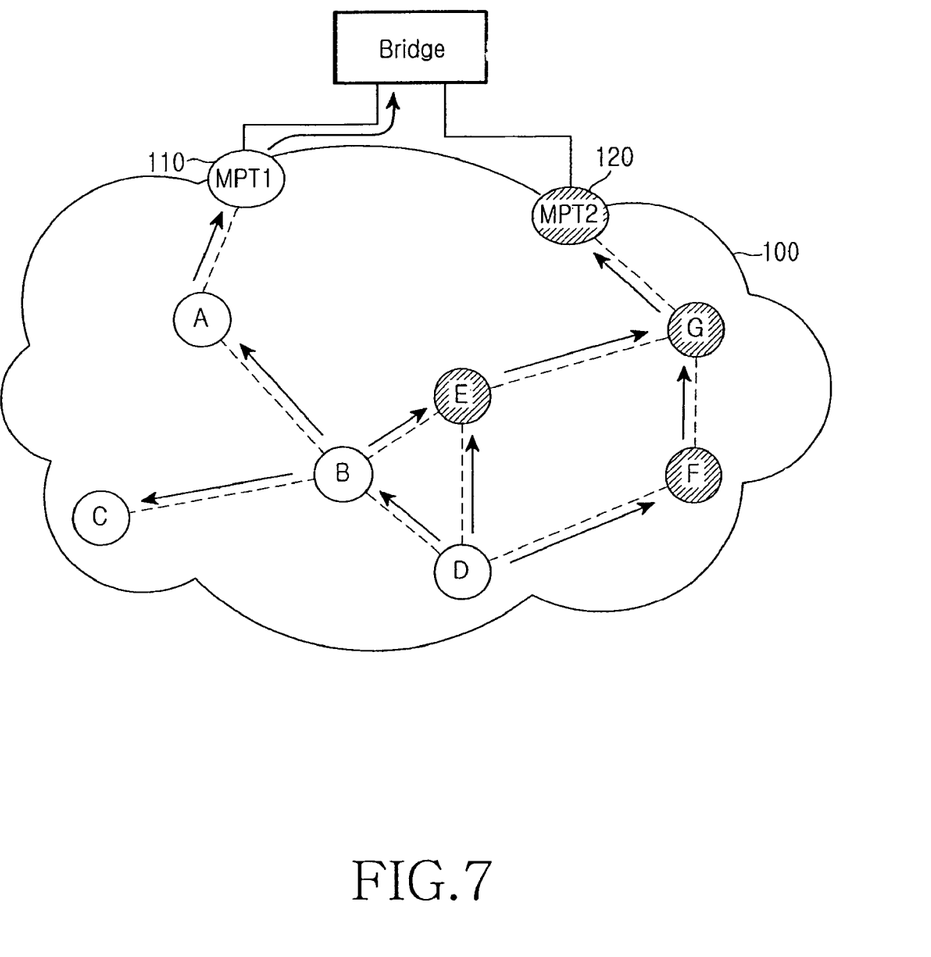
FIG. 7 illustrates a process for routing a broadcast data frame to be transmitted from inside to outside of the mesh network with multiple mesh portals in accordance with an exemplary embodiment of the present invention.
Figure 8A:
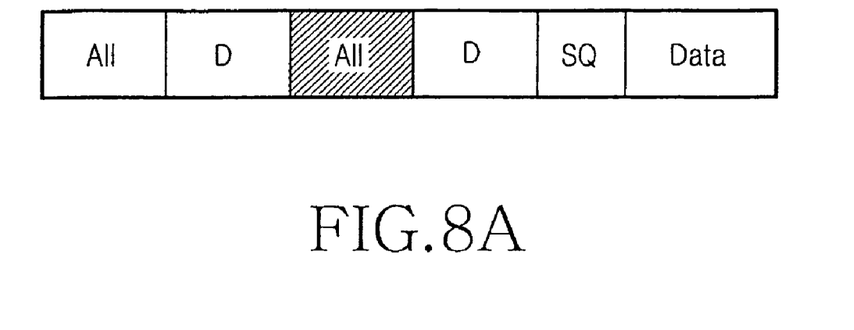
FIGS. 8(a)-8(c) schematically illustrate main parts of the broadcast data frame used in the routing process of FIG. 7.
Figure 8B:
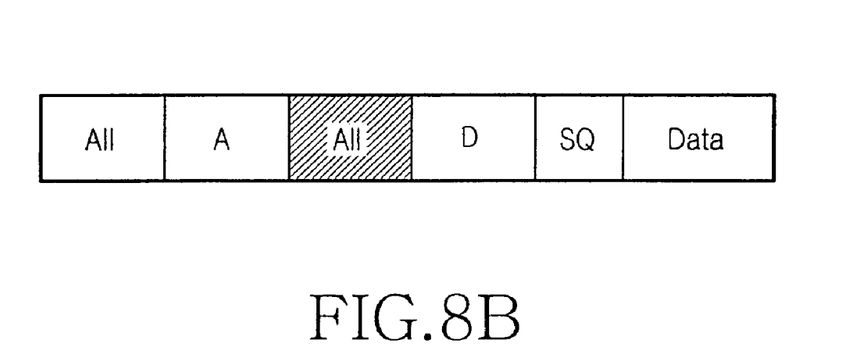
Figure 8C:
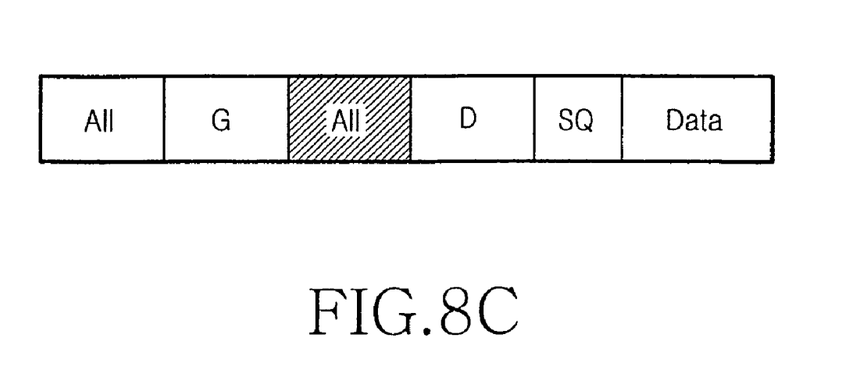

FIG. 7 illustrates a process for routing a broadcast data frame to be transmitted from inside to outside of the mesh network with multiple mesh portals in accordance with an exemplary embodiment of the present invention. FIGS. 8(*a*)-8(*c*) schematically illustrate main parts of the broadcast data frame used in the routing process of FIG. 7. FIG. 8(*a*) illustrates a data frame broadcast from Mesh Point D. FIG. 8(*b*) illustrates a data frame broadcast from Mesh Point A. FIG. 8(*c*) illustrates a data frame broadcast from Mesh Point G. All the destination address fields of FIGS. 8(*a*), 8(*b*), and 8(*c*) indicate an "ALL" value, respectively.

Every mesh point of the mesh network 100 checks the destination address field of the received broadcast data frame as illustrated in FIGS. 4, 5, and 8, respectively. If the destination address field indicates the "ALL" value, the mesh point can determine that the associated broadcast data frame has been generated inside the mesh network 100. If the destination address field indicates address information of a specific mesh portal, the mesh point can easily determine that the data frame has been received from outside of the mesh network 100 using the destination address field.

That is, if the destination address field indicates a specific mesh portal when an arbitrary mesh point receives a broadcast data frame, the mesh point can determine that a destination is outside the mesh network 100 and the associated data frame should be transmitted to outside of the mesh network 100 through the mesh portal. Thus, the mesh point can transmit the data frame to its default mesh portal using a minimum number of hops without delay. Further, when the destination address field of the received broadcast data frame indicates the "ALL" value, the mesh point can determine that a destination is only inside the mesh network 100. Thus, because the destination can be found only inside the mesh network 100, the number of hops required to transmit the data frame and delay can be reduced. At this time, when the mesh points process the data frame in which the destination address field indicates addresses of all mesh portals, the mesh points determine whether a frame is redundant through tuple values of a source address (src addr) field, a destination address (dest addr), an E2E_seq_ctrl field, and the like.

Figure 9:
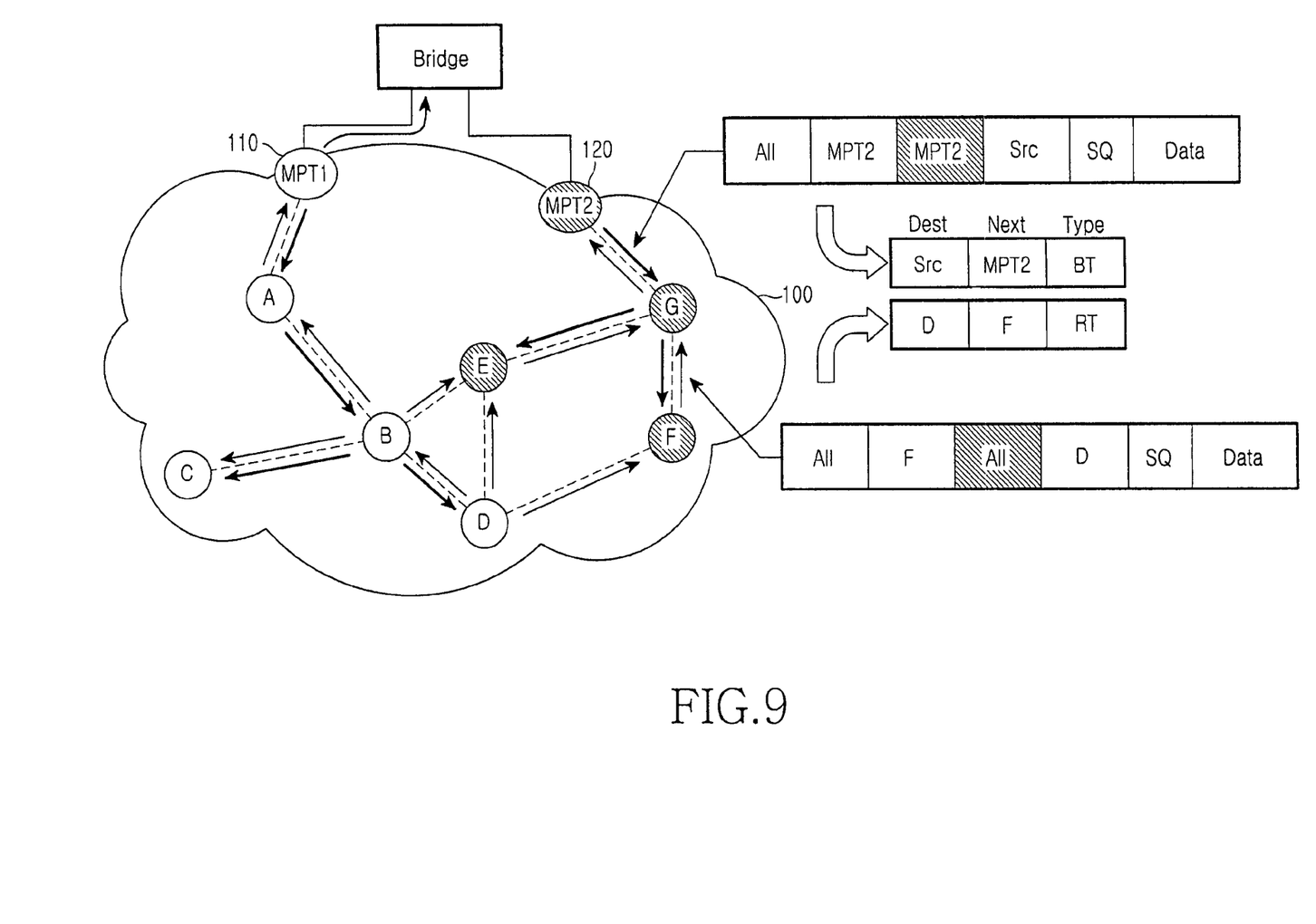
FIG. 9 illustrates a routing table and a bridge table generated in the process for routing a broadcast data frame in the mesh network with multiple portals and a process for generating the routing table and the bridge table in accordance with an exemplary embodiment of the present invention.

According to the IEEE 802.11s standard, a determination can be made as to whether a frame destination is outside or inside the mesh network 100 using a routing table. A process for generating a routing table and a bridge table in the method for routing a broadcast data frame in accordance with an exemplary embodiment of the present invention will be described with reference to FIG. 9. FIG. 9 illustrates the routing table and the bridge table generated in the process for routing a broadcast data frame in the mesh network with multiple portals and a process for generating the routing table and the bridge table in accordance with an exemplary embodiment of the present invention. When mesh points receive the broadcast data frame, they generate the routing table and the bridge table and determine whether a frame destination is inside or outside the mesh network 100 using the generated routing and bridge tables.

Referring to FIG. 9, when receiving the broadcast data frame from inside of the mesh network 100, that is, receiving the broadcast data frame in which a destination address field does not have an "ALL" value, a mesh point generates the bridge table and stores the destination address field in the generated bridge table. Further, when receiving the broadcast data frame in which the destination address field has the "ALL" value, the mesh point generates the routing table and stores the destination address field in the generated routing table.

In detail, because the destination address field of a data frame broadcast from the second mesh portal 120 to Mesh Point G is set to address information of the second mesh portal 120 as illustrated in FIG. 9, Mesh Point G compares an address of its default mesh portal with an address of the destination address field of the received broadcast data frame. Because the address of the default mesh portal is equal to that of the destination address field, the data frame is broadcast. At this time, because the destination address field does not have the "ALL" value, it is stored in the bridge table. Source address information corresponding to an origination address of the data frame is set in the destination address field of the bridge table. A transmitter address or the address information of the second mesh portal 120 acting as the default mesh portal is set in a next hop address field. On the other hand, when the routing table is invalid, a route discovery procedure is performed.

Further, because the destination address field of a data frame broadcast from Mesh Point F to Mesh Point G has the "ALL" value as illustrated in FIG. 9, it is stored in the routing table. Address information of Mesh Point D corresponding to an origination address of the data frame is set in the destination address field of the routing table. Address information of Mesh Point F corresponding to a transmitter address is set in the next hop address field. On the other hand, when the bridge table is invalid, a silently discard or portal update request message is transmitted. Thus, when each mesh point determines that the frame destination is outside the mesh network 100, the data frame is immediately transmitted through the mesh portal without broadcasting. When the frame destination is determined to be outside the mesh network 100, the data frame is forwarded using a route request message.

In an apparatus and system for routing a broadcast data frame in a mesh network with multiple mesh portals in accordance with an exemplary embodiment of the present invention as described above, a mesh portal acting as a connection node for an external network in the mesh network supporting multihop routing includes its Medium Access Control (MAC) address or its Identifier (ID) information in an associated data frame when retransmitting the broadcast data frame from outside to inside of the mesh network. Thus, every mesh point of the mesh network can determine whether a data frame has been received from a registered mesh portal using the ID information. When receiving a data frame from the mesh portal, the mesh point checks a destination address field and forwards the received data frame if it has been received from the registered mesh portal. Otherwise, the mesh point discards the received data frame without processing it, such that redundant routing of the data frame is prevented.

Further, when the mesh point transmits a broadcast data frame in the present invention, it performs a function for retransmitting the data frame in which the destination address field indicates information of all mesh portals rather than ID information of a mesh portal. When receiving a broadcast data frame in which mesh portal ID information indicates all mesh portals, a mesh point further retransmits the broadcast data frame without discarding it. A determination can be easily made as to whether an associated frame has been received from outside or inside of the mesh network using its destination address field.

When receiving a broadcast data frame in which a destination address indicates a specific mesh portal or all mesh portals, the mesh point and portal compute routing and bridge paths using address information of the associated frame. That is, when receiving a broadcast data frame containing ID information of the specific mesh portal, a node sending the associated frame is outside the mesh network, such that related information is stored in the bridge table. When receiving a broadcast data frame containing ID information indicating all the mesh portals, a node sending the associated frame is inside the mesh network, such that related information is stored in the routing table. Thus, a determination can be easily made as to whether a destination of the broadcast data frame is outside or inside the mesh network.

As is apparent from the above description, exemplary embodiments of the present invention can prevent redundant routing of a broadcast data frame in a mesh network with multiple mesh portals.

Moreover, exemplary embodiments of the present invention can distribute and transmit traffic of a data frame using multiple mesh portals in the mesh network, thereby preventing traffic from being concentrated on a specific mesh portal.

Moreover, exemplary embodiments of the present invention can reduce the number of hops required to transmit traffic in the mesh network with multiple mesh portals, thereby reducing an end-to-end transmission delay.

Moreover, exemplary embodiments of the present invention can determine whether a reference table is a routing table or a bridge table when a path is established in the mesh network with multiple mesh portals. Thus, a mesh point can determine whether a destination of a received data frame is outside or inside the mesh network, thereby providing stable and reliable routing.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. A method for routing a broadcast data frame in a mesh network, the mesh network comprising multiple mesh portals for providing a communication interface between a network outside the mesh network and multiple mesh points within the mesh network, the method comprising:

comparing, by a mesh point, a destination address of a broadcast data frame with an address of a registered mesh portal when the mesh point receives the broadcast data frame;

broadcasting the broadcast data frame within the mesh network if the destination address is equal to the address of the registered mesh portal;

discarding the broadcast data frame when the destination address is different from the address of the registered mesh portal;

setting the destination address of the broadcast data frame to address information of a mesh portal that receives the broadcast data frame from the network outside the mesh network, if the broadcast data frame is received from outside to inside of the mesh network; and setting the destination address of the broadcast data frame to a value representing all mesh portals, if the broadcast data frame is transmitted from inside to outside of the mesh network.

2. The method of claim 1, further comprising:
selecting and registering a default mesh portal when the mesh point enters inside the mesh network.

3. The method of claim 1, further comprising:
setting an origination address and a transmitter address of the broadcast data frame in a destination address field and a next hop address field and storing the destination address field and the next hop address field in a routing table, when the destination address of the broadcast data frame received by the mesh point indicates all nodes; and setting the origination address and the transmitter address of the broadcast data frame in the destination address field and the next hop address field and storing the destination address field and the next hop address field in a bridge table, when the destination address of the broadcast data frame received by the mesh point does not indicate all the nodes.

4. The method of claim 3, further comprising:
performing a route discovery procedure in the mesh point when the bridge table is invalid.

5. The method of claim 3, further comprising:
discarding an invalid routing table in the mesh point when the routing table is invalid; and
transmitting a portal update request message to inside of the mesh network.

6. The method of claim 1, wherein the mesh point transmits the broadcast data frame to the registered mesh portal when the broadcast data frame is transmitted to outside of the mesh network.

7. A method for routing a broadcast data frame in a mesh network, the mesh network comprising multiple mesh portals for providing a communication interface between a network outside the mesh network and multiple mesh points within the mesh network, the method comprising:

setting, by a mesh portal that receives a broadcast data frame from the network outside the mesh network, address information of the mesh portal in a destination address field of the broadcast data frame if the broadcast data frame is received from outside to inside of the mesh network;

broadcasting the broadcast data frame in which the address information of the mesh portal has been set to a destination address inside of the mesh network; and setting the destination address field of the broadcast frame to a value representing all mesh portals, if the broadcast data frame is transmitted from inside to outside of the mesh network.

8. The method of claim 7, wherein the mesh portal transmits a data frame to the network outside the mesh network when the data frame received from inside of the mesh network is a unicast data frame, and discards the received data frame when the received data frame is a broadcast data frame.

9. An apparatus for routing a broadcast data frame in a mesh network, the apparatus comprising:

the mesh network comprising multiple mesh portals for providing a communication interface between a network outside the mesh network; and multiple mesh points within the mesh network, wherein a mesh point of the multiple mesh points compares a destination address of a broadcast data frame with an address of the multiple mesh points registered mesh portal when receiving the broadcast data frame, broadcasts the broadcast data frame within the mesh network if the destination address is equal to the address of the registered mesh portal, and discards the broadcast data frame when the destination address is different from the address of the registered mesh portal, wherein the destination address of the broadcast data frame is set to address information of a mesh portal that receives the broadcast data frame from the network outside the mesh network, if the broadcast data frame is received from outside to inside of the mesh network; and wherein the destination address of the broadcast data frame is set to a value representing all mesh portals, if the broadcast data frame is transmitted from inside to outside of the mesh network.

10. The apparatus of claim 9, wherein the multiple mesh points select and register its default mesh portal when entering inside the mesh network.

11. The apparatus of claim 9, wherein the multiple mesh points set an origination address and a transmitter address of the broadcast data frame in a destination address field and a next hop address field and store the destination address field and the next hop address field in a routing table, when the destination address of the broadcast data frame indicates all nodes, and set the origination address and the transmitter address of the broadcast data frame in the destination address field and the next hop address field and store the destination address field and the next hop address field in a bridge table, when the destination address of the broadcast data frame does not indicate all the nodes.

12. The apparatus of claim 11, wherein the multiple mesh points perform a route discovery procedure when the bridge table is invalid.

13. The apparatus of claim 11, wherein the multiple mesh points discard an invalid routing table when the routing table is invalid, and transmit a portal update request message to inside of the mesh network.

14. The apparatus of claim 9, wherein the multiple mesh points transmit the broadcast data frame to the registered mesh portal when the broadcast data frame is transmitted to outside of the mesh network.

15. An apparatus for routing a broadcast data frame in a mesh network, the apparatus comprising:

the mesh network comprising multiple mesh portals for providing a communication interface between a network outside the mesh network; and multiple mesh points within the mesh network, wherein a mesh portal of the multiple mesh portals sets its address information in a destination address field of a broadcast data frame when the broadcast data frame is received from outside to inside of the mesh network, broadcasts the broadcast data frame in which its address information has been set to inside of the mesh network, and sets the destination address field of the broadcast data frame to a value representing all mesh portals if the broadcast data frame is transmitted from inside to outside of the mesh network.

16. The apparatus of claim 15, wherein the multiple mesh portals transmit a data frame to the network outside the mesh network when the data frame received from inside of the mesh network is a unicast data frame, and discard the received data frame when the received data frame is a broadcast data frame.

17. A system for routing a broadcast data frame in a mesh network, the system comprising:

the mesh network comprising multiple mesh portals for providing a communication interface between a network outside the mesh network; and multiple mesh points within the mesh network, wherein a mesh point of the multiple mesh points compares a destination address of a broadcast data frame with an address of its registered mesh portal when receiving the broadcast data frame, broadcasts the broadcast data frame within the mesh network if the destination address is equal to the address of the registered mesh portal, and discards the broadcast data frame when the destination address is different from the address of the registered mesh portal, and wherein a mesh portal of the multiple mesh portals sets its address information in a destination address field of the broadcast data frame when the broadcast data frame is received from outside to inside of the mesh network, broadcasts the broadcast data frame in which its address information has been set to a destination address inside of the mesh network, and sets the destination address field of the broadcast data frame to a value representing all mesh portals if the broadcast data frame is transmitted from inside to outside of the mesh network.

18. The system of claim 17, wherein the multiple mesh points select and register its default mesh portal when entering inside the mesh network.

19. The system of claim 17, wherein the multiple mesh points set an origination address and a transmitter address of the broadcast data frame in a destination address field and a next hop address field and store the destination address field and the next hop address field in a routing table, when the destination address of the broadcast data frame indicates all nodes, and set the origination address and the transmitter address of the broadcast data frame in the destination address field and the next hop address field and store the destination address field and the next hop address field in a bridge table, when the destination address of the broadcast data frame does not indicate all the nodes.

20. The system of claim 19, wherein the multiple mesh points perform a route discovery procedure when the bridge table is invalid.

21. The system of claim 19, wherein the multiple mesh points discard an invalid routing table when the routing table is invalid, and transmit a portal update request message to inside of the mesh network.

22. The system of claim 17, wherein the multiple mesh points transmit the broadcast data frame to the registered mesh portal when the broadcast data frame is transmitted to outside of the mesh network.

23. The system of claim 17, wherein the multiple mesh portals transmit a data frame to the network outside the mesh network when the data frame received from inside of the mesh network is a unicast data frame, and discard the received data frame when the received data frame is a broadcast data frame.

* * * * *

UNITED STATES PATENT AND TRADEMARK OFFICE
CERTIFICATE OF CORRECTION

| | | |
|---|---|---|
| PATENT NO. | : 7,869,434 B2 | Page 1 of 1 |
| APPLICATION NO. | : 11/541641 | |
| DATED | : January 11, 2011 | |
| INVENTOR(S) | : Yong-Sung Roh et al. | |

It is certified that error appears in the above-identified patent and that said Letters Patent is hereby corrected as shown below:

On the Title page of the patent, Item (60) in the "Related U.S. Application Data Section," delete "(60) Provisional application No. 60/723,910, filed on Jun. 7, 2006." and insert --(60) Provisional application No. 60/723,910, filed on Oct. 6, 2005.--

Signed and Sealed this
Tenth Day of May, 2011

David J. Kappos
*Director of the United States Patent and Trademark Office*